Nov. 26, 1935.  J. FERGUSON  2,022,112
ELECTRIC FURNACE AND METHOD OF OPERATION
Filed July 9, 1934
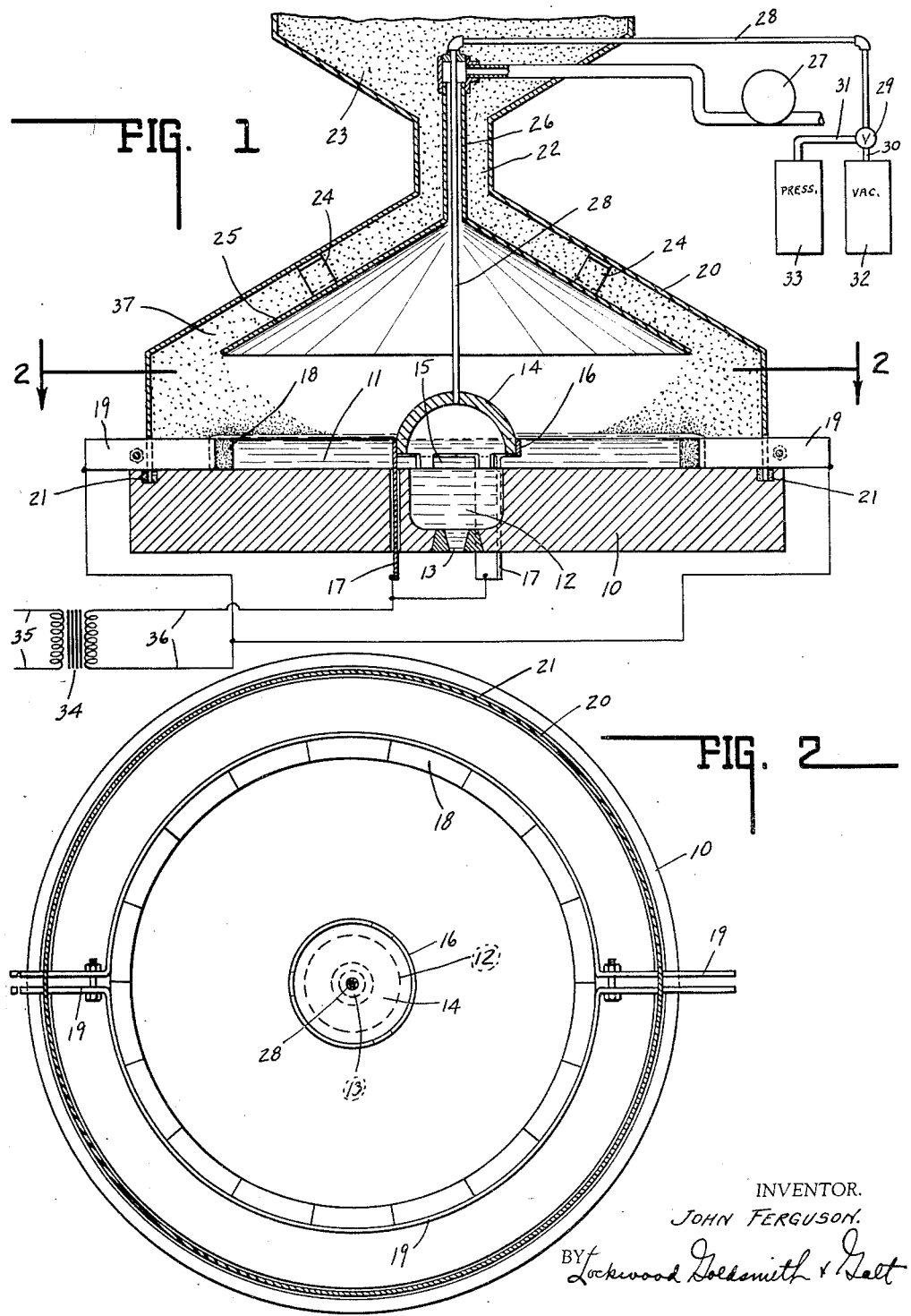
INVENTOR.
JOHN FERGUSON.
BY Lockwood Goldsmith & Galt
ATTORNEYS.

Patented Nov. 26, 1935

2,022,112

UNITED STATES PATENT OFFICE 2,022,112

ELECTRIC FURNACE AND METHOD OF OPERATION

John Ferguson, Indianapolis, Ind.

Application July 9, 1934, Serial No. 734,247

12 Claims. (Cl. 13—6)

This invention relates to an electric furnace and a method of operation particularly adapted to the melting of glass, but equally useful for other purposes.

The general object of the invention is to provide a furnace in which the heat history of the charge is such as to provide a finished product having a high degree of homogeneity and freedom from gas bubbles or "seed" and in which the heat loss from the furnace is a minimum.

To this end there is provided an arrangement in which the heat ordinarily lost from the furnace is used to preheat the batch material before it enters the melting zone. The path of movement of the material through the furnace is so arranged that all sections of the batch uniformly pass through zones of steadily increasing temperature until a predetermined maximum temperature is reached which is substantially the same for all parts of the batch. Thereafter the batch passes into a section of the furnace outside the melting zone where material from all parts of the furnace is commingled and begins to undergo a process of cooling down to a working temperature.

One feature of the invention resides in the arrangement by which the batch is preheated by the heat radiated from the molten material and by the heat released from said material by the gases produced by the chemical reactions therein. A circular furnace is preferably used, the whole being covered by a conical dome or roof at the apex of which the batch material is fed. Within the dome there is provided a conical structure which with the conical dome provides a passageway distributing the batch material from the apex of the dome to all parts of the periphery of the furnace. The entire inner surface of the dome is thus lined with a layer of incoming batch material through which heat must pass in order to escape from the furnace. Since the batch material is not an efficient heat conductor, the greater part of the heat which would ordinarily be lost goes to preheat the material or is prevented from leaving the furnace by the insulating effect of the material. That which preheats the material is carried back into the furnace thereby.

Another feature of the invention resides in the fact that the batch material moves from the periphery of the furnace toward a central discharge opening. Since all the raw batch is dumped into the furnace in a zone most remote from the discharge opening, all parts of the batch must pass through substantially the same heat history before reaching the discharge opening.

Another feature of the invention is the provision of a central well or settling chamber in which the molten glass from all parts of the furnace may be gathered out of contact with unmelted batch material and free from the action of the heating current. This well is located immediately above the central discharge opening and, by mixing the molten glass from all parts of the furnace, it promotes the homogeneity of the finished product. The well is preferably roofed over with a refractory dome having openings adjacent the floor of the furnace permitting entrance of molten glass thereto. The refractory dome prevents entrance of stray bits of unmelted batch to the well and in addition forms a chamber in which the pressure may be regulated to control the flow of glass therefrom.

Another feature of the invention resides in the arrangement of electrodes which are preferably circular in form and concentric. The inner electrode surrounds the refractory dome and is sufficiently spaced above the hearth floor to permit flow of glass therebeneath to the central well. The outer circular electrode is located at the outer periphery of the hearth floor. Because of the concentric positioning of the electrodes the current density per degree of the furnace diameter is substantially uniform while the current density per unit area of cross section increases toward the center of the furnace. Thus, the portion of the glass near the central electrode is at the highest temperature and the glass from all parts of the periphery of the furnace progresses uniformly from the zone of lower temperature at the periphery to that of highest temperature at the inner electrode of the furnace. The heat history of each part of the charge is, therefore, substantially the same.

Another important effect of this electrode arrangement is that only the inner electrode need be formed of a highly refractory metallic material. Preferably tungsten or a tungsten alloy is used for the inner electrode while the outer electrode in the zone of lower temperature may be made of iron, graphite or other material even less resistant to heat without danger of undue deterioration of the electrode or discoloration of the glass.

Another feature of the invention resides in the use of thoriated tungsten for the inner electrode. The addition of thorium or its compounds to tungsten metal markedly retards the growth of the tungsten crystals which otherwise tend to form and grow when held at high temperatures. The use of thoriated tungsten helps, therefore, to prolong electrode life.

Other objects and features of the invention will be understood from the accompanying drawing and the following description and claims:

Fig. 1 is a central sectional view through a glass furnace constructed in accordance with the invention. Fig. 2 is a sectional plan view of the same taken on the line 2—2 of Fig. 1.

In the drawing there is shown a hearth 10 having a substantially flat floor 11 and a central glass receiving well 12. In the bottom of the well 12 there is provided a discharge opening 13. Covering the well 12 there is a refractory dome 14 resting upon the floor 11 and provided with a plurality of passages 15 adjacent said floor for permitting the flow of glass to the well 12. Surrounding the dome 14 and supported above the floor there is a circular inner electrode 16. The electrode 16 is preferably of tungsten or other refractory material which can safely be immersed in molten glass at high temperature without danger of oxidation or other chemical reaction. The electrode 16 is supported upon one or more leads 17, preferably of the same material. About the outer edge of the floor 11 there is provided a circular outer electrode 18 herein shown in the form of a plurality of graphite blocks clamped together by a pair of metallic bands 19 which serve also as electrical leads for said electrode.

The fact that with circular electrodes the current density increases toward the central electrode insures a much lower temperature in the zone of the outer electrode so that it is not necessary in most cases to use a highly refractory metal for the outer electrode. With a substantially flat floor the outer electrode may be maintained at about 1400° F. while the inner electrode is at 2500° F. or higher. At the low temperature, the outer electrode may be of iron, graphite or other material without danger of discoloration of glass. As previously stated, the inner electrode may be of tungsten or tungsten alloy.

A conical dome or roof 20 is supported upon the hearth 10 and covers the entire furnace floor. It is provided about its edges with a suitable seal 21 which is substantially air-tight. Communicating with the apex of the dome 20 there is a passageway 22 leading from a batch hopper 23. Within the dome 20 and supported therefrom by brackets 24 there is a conical distributing cone 25. Connected to the peak of the cone 25 there is a pipe 26 leading upwardly through the passage 22 and connected to a pump 27 for removal of the gases, chiefly carbon dioxide, which are the products of the chemical reactions within the furnace.

Connected to the top of the refractory dome 18 there is a pipe 28 leading upwardly through the pipe 26 and connected to a three-way valve 29. The said valve is connected by pipes 30 and 31 to a vacuum tank 32 and a pressure tank 33 respectively. The said tanks are maintained at a suitable vacuum and pressure respectively by mechanism not shown. To control the rate of discharge of glass from the orifice 13, the pressure beneath the dome 14 is varied by suitable manipulation of the valve 29. For a steady flow or for gob feed under certain conditions the pressure connection is not required, adequate control being secured by variations between atmospheric pressure and a predetermined vacuum.

For supplying current for melting and heating the glass there is provided a transformer 34 having its primary winding connected by power mains 35 to a suitable source of single phase alternating current and having its secondary winding connected by conductors 36 to the leads 17 and 19.

In the operation of the furnace the batch material 37 is constantly fed by gravity from the hopper 23 through the passage 24 to the space between the dome 20 and the cone 25. It is discharged from said space about the edge of the furnace above the outer electrode and fills the space between said electrode and the wall of the dome 20. The electrode serves as a retaining wall to maintain the molten glass out of contact with the furnace wall, such molten material as passes over the top of the electrode being quickly solidified in the cooler outer zone, and its movement toward the furnace wall before solidification being prevented by the pile of batch. The batch material serves as excellent heat insulation and prevents loss of heat by radiation from the surface of the dome 20. The greater part of the heat which would otherwise be lost by such radiation simply goes to preheat the batch and is returned thereby to the furnace.

It will also be seen that the outgoing gases from the chemical reaction are in heat exchanging relation with the incoming batch over the whole inner surface of the cone 25 and throughout the length of the pipe 26. The heat from this source provides an additional means of preheating the batch.

As the glass is drawn off, the batch in the neighborhood of the outer electrode is melted and moves through the furnace toward the center. The rate of flow is such that no unmelted batch reaches the inner electrode and since the distance travelled and current density per degree of periphery is uniform about the furnace, the material reaching the center from each part of the periphery has substantially the same heat history.

The molten glass is drawn into the well 12 through the openings 15 adjacent the furnace floor. The glass at this point is substantially free of gas bubbles or "seed" because it has been subjected to the highest temperature for the greatest length of time, because there is no covering of batch material at this point to impede the escape of gas and to produce more gas and because the space above the hearth is maintained at less than atmospheric pressure by the pump 27. The batch material substantially filling the entire space between the hood 20 and cone 25 as well as the passage 22 effectively prevents entrance of air from the batch hopper 23.

Further uniformity of the finished product is secured by mingling the glass from all sides of the furnace in the central well 12 before discharge. At this point also the last vestiges of seed are removed, assisted by the sub-atmospheric pressure maintained therein during periods between the feeding of gobs from the orifice 13. In the well 12 the material may be slightly cooled from the higher melting temperature to that desired for working.

From the foregoing description, it will be apparent that the invention possesses numerous advantages over electric furnaces in prior use. The details thereof may be varied within wide limits without departing from the scope of the invention as defined by the appended claims. While the invention has been particularly described in relation to a glass furnace, many of the features thereof are applicable to furnaces used for other purposes.

The invention claimed is:

1. In an electric furnace, the combination of a hearth having a central discharge opening, a central electrode surrounding said opening and having a passageway therebetween permitting flow of molten material to said opening, a circular peripheral electrode of greater diameter than the central electrode, and electrical apparatus connected to said electrodes for passing a current between the same.

2. In an electric furnace, the combination of a hearth having a central well for accumulation of molten material, said well having a discharge opening at the bottom thereof, a central electrode surrounding said well and having a passageway therebeneath permitting flow of molten material to said well, a circular peripheral electrode of greater diameter than the central electrode, and electrical apparatus connected to said electrodes for passing a current between the same.

3. In an electric furnace, the combination of a hearth having a central discharge opening, a circular outer electrode, a circular inner electrode supported above the floor of said hearth about said discharge opening, and electrical apparatus connected to said electrodes for passing a current between the same.

4. In an electric furnace, the combination of a hearth having a central discharge opening, a refractory dome covering said discharge opening and having passages adjacent the floor of the hearth for permitting flow of molten material to said opening, an electrode supported above the floor of said hearth and positioned outside of said dome, an outer electrode, and electrical apparatus connected to said electrodes for passing a current between the same.

5. In an electric furnace, the combination of a hearth having a central well for the accumulation of molten material, a refractory dome covering said well and having passages adjacent the floor of the hearth for permitting flow of molten material to said well, an electrode supported above the floor of said hearth and positioned outside of said dome, an outer electrode, and electrical apparatus connected to said electrodes for passing a current between the same.

6. In an electric glass furnace, the combination of a hearth having a central well for receiving molten glass, a refractory dome covering said well and having passages adjacent the floor of the hearth for flow of molten glass to said well, a pipe connection to said dome, and means associated with said pipe connection for varying the pressure therein to control the flow of glass from said well.

7. A method of operation of a furnace having a central discharge opening including the steps of maintaining progressively increasing temperatures from the periphery inwardly to a predetermined zone of maximum temperature, maintaining a lower temperature in a zone about said discharge opening, said first mentioned zone substantially surrounding said second mentioned zone, and moving material to be melted from an outer zone of the furnace to said discharge opening.

8. An electric furnace having an annular melting zone and a central collecting zone surrounded by said melting zone, and means for passing electric currents through said melting zone but not through said collecting zone.

9. An electric furnace having an annular melting zone and a central collecting zone surrounded by said melting zone, means for passing electric currents through said melting zone but not through said collecting zone, and means for varying the pressure on material in said collecting zone independently of that in the melting zone for controlling the discharge of material therefrom.

10. In an electric furnace, the combination of a hearth, a central electrode, a circular outer electrode, and means for passing an electric current between said electrodes, said outer electrode including a plurality of blocks of a heat resisting electric conducting material of low tensile strength and a metallic hoop securing the same in circular position.

11. In an electric furnace, the combination of a hearth, a central electrode, a circular outer electrode, and means for passing an electric current between said electrodes, said outer electrode including a plurality of blocks of graphite and a metallic hoop securing the same in circular position.

12. In a melting furnace, the combination of a hearth on which material is melted, a dome covering said hearth, a conduit for delivering material to be melted at the top of said dome, a distributing dome within said first mentioned dome arranged to distribute said material to the periphery of the hearth, and a conduit for gaseous products generated in said furnace, said conduit leading from the top of said distributing dome upwardly through said first mentioned conduit.

JOHN FERGUSON.